United States Patent
Polidora

[11] 3,776,590
[45] Dec. 4, 1973

[54] WINDSHIELD VISOR

[76] Inventor: Frank J. Polidora, 827 Elizabeth St., Turtle Creek, Pa. 15145

[22] Filed: Aug. 23, 1972

[21] Appl. No.: 283,153

[52] U.S. Cl................. 296/95 R, 2/325, 24/206 A, 160/368 S
[51] Int. Cl........................... B60j 1/00, B60j 11/00
[58] Field of Search................ 296/95 R; 160/368 S; 24/206 A, 16 PB; 2/325

[56] References Cited
UNITED STATES PATENTS

| | | | |
|---|---|---|---|
| 3,123,394 | 3/1964 | Corsetti | 296/95 R |
| 2,812,208 | 11/1957 | Francis | 296/95 R |
| 2,633,381 | 3/1953 | Francis | 296/95 R |
| 2,743,957 | 5/1956 | Sherman | 296/95 R |
| 2,843,421 | 7/1958 | Shelton | 296/95 R |
| 2,853,129 | 9/1958 | Leavitt et al. | 296/95 R |
| 2,989,339 | 6/1961 | Southall | 296/95 R |

FOREIGN PATENTS OR APPLICATIONS

| | | | |
|---|---|---|---|
| 839,631 | 5/1952 | Germany | 2/325 |

Primary Examiner—Kenneth H. Betts
Assistant Examiner—John A. Pekar
Attorney—Sherman H. Barber

[57] ABSTRACT

A flexible membrane supported by a frame comprising stiffeners and legs is fitted to the top of an automobile in such a way that it overhangs the windshield and a portion of the hood of the automobile. The visor protects the windshield from natural precipitation such as rain and snow and the like when persons in an automobile are viewing a motion picture at an outdoor theater.

3 Claims, 5 Drawing Figures

PATENTED DEC 4 1973 3,776,590

WINDSHIELD VISOR

BACKGROUND OF THE INVENTION

When persons are sitting in their automobile and viewing a motion picture at an outdoor theater it often rains and even snows, thereby necessitating starting the engine of the automobile to actuate the windshield wipers to keep the windshield clear. In some instances, whenever the windshield wipers are electrically operated, it is a drain on the battery of the automobile to run them continually. In either case, it is very annoying to be viewing a motion picture while the windshield wipers are running continually.

Heretofore there has been no satisfactory way to avoid operating the wipers in order to have a clear view of the motion picture screen. However, the apparatus of my invention is simple and is easy to install on an automobile whenever such precipitation commences, and it is just as easy to remove when the precipitation stops. Further, my apparatus of the invention prevents precipitation from falling on the windshield and yet every person in the automobile has a clear and unobstructed view of the motion picture screen.

How the apparatus of my invention accomplishes these results will be evident to those having skill in the art from the following description in conjunction with the drawing.

SUMMARY OF THE INVENTION

A membrane is supported by a frame that is positioned in front of the windshield of an automobile, the membrane covering the windshield and a small portion of the hood of the automobile. The membrane is removably secured to the roof portion of the automobile so that it may be easily and quickly installed and removed as desired.

For a further understanding of the invention and for the features and advantages thereof, reference may be made to the following description and drawing of one embodiment of my invention.

DETAILED DESCRIPTION

Figure 1:
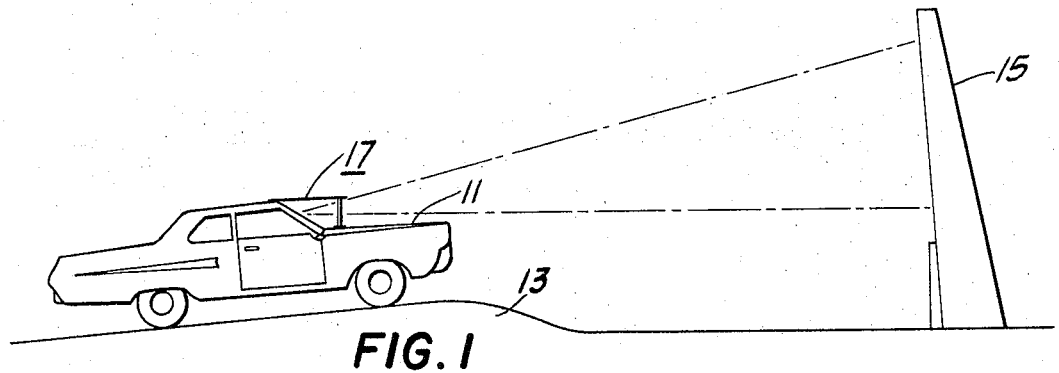
FIG. 1 is a schematic representation of an automobile at an outdoor theater showing the automobile equipped with one embodiment of my invention.

Referring to FIG. 1, a typical automobile 11 is shown in a parked position at an outdoor theater with the front wheels of the vehicle at rest on a slight mound 13 as is customary. A motion picture screen 15, also customary, is shown in the usual position relative to the vehicle.

The automobile 11 is fitted with an embodiment of my windshield visor 17, which is shown in more particular detail in other figures of the drawing. It comprises a frame 19 that supports a flexible membrane 21 that is water repellant and, preferaby, waterproof.

The frame 19 includes a pair of upright hinged legs 23,25 that have conventional vacuum-type cups 27,29 respectively at one end and that are connected at the other ends by hinges to transverse members 31,33. The vacuum-type cups 27,29 engage and secure the legs 23,25 to the hood or fender portions of the vehicle. Of course, in another instance there may be only a single leg that supports the frame 19 if preferred.

Figure 2:
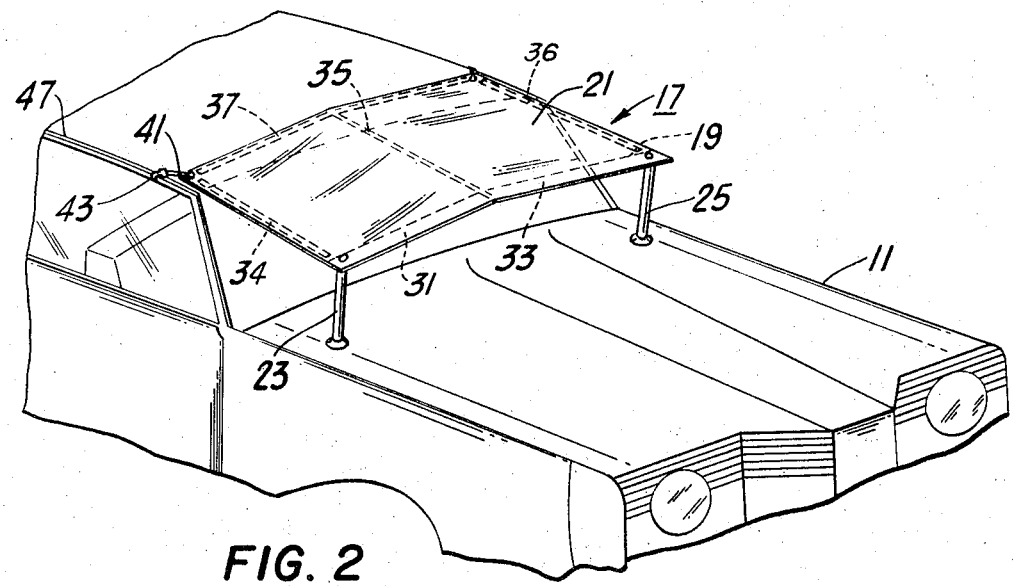
FIG. 2 is a schematic perspective view of a portion of the automobile of FIG. 1 showing the structure of the embodiment of my invention.

The transverse members 31,33 are also hinged in the center where they abut, and they are so arranged that they are vaulted at the front, as may be noticed from FIG. 2.

The membrane 21 covers the frame 19 and may be secured to it in any suitable manner. A pair of elongate members 34,36 are secured to the outer longitudinal edges of the membrane 21 thereby rigidifying these edges. These elongate members 34,36 extend from adjacent the transverse members 31,33 backward toward the top portion of the automobile 11, as shown in FIG. 2.

Additionally, the membrane carries a strut 35 that rigidifyies the center portion of the membrane 21 and that extends generally perpendicular and in a direction away from the transverse members 31,33. The strut 35 may be secured to the membrane 21 in any suitable manner, and the strut may be made of any preferred material such as wood, plastic and the like.

The frame 19 may be made of wood or plastic and it is so constructed that when not in use it is collapsible into a small compact size that is easily carried in an automobile or stowed at the drive-in theater.

The rear edge of the membrane 21 carries a foam rubber, or other suitable sealing strip 37 that is disposed between the membrane 21 and the top of the automobile 11. In some instances the sealing may be effected by providing a hollow tubular rear edge 38 (FIG. 5) on the membrane if such is preferred. In any case the sealing means conforms to the roof contour of the automobile 11.

In one aspect of the invention, shown in FIG. 2, the rear corners of the membrane 21 are each fitted with a grommet 39 through which is looped an adjustable strap 41. The strap 41 is made preferably of an elastic material and has a hook-type connector 43 that engages a conventional rain guard 45 of the automobile 11. The strap 41 is provided with a plurality of cooperative fasteners 45, though other means of securing the upper strap portion to the lower portion may be used if desired. The straps 41 are adjustable to pull the back edge of the membrane taut so that the sealing means firmly contacts the top of the automobile 11 and forms a weather-tight seal.

Figures 3, 4, 5:
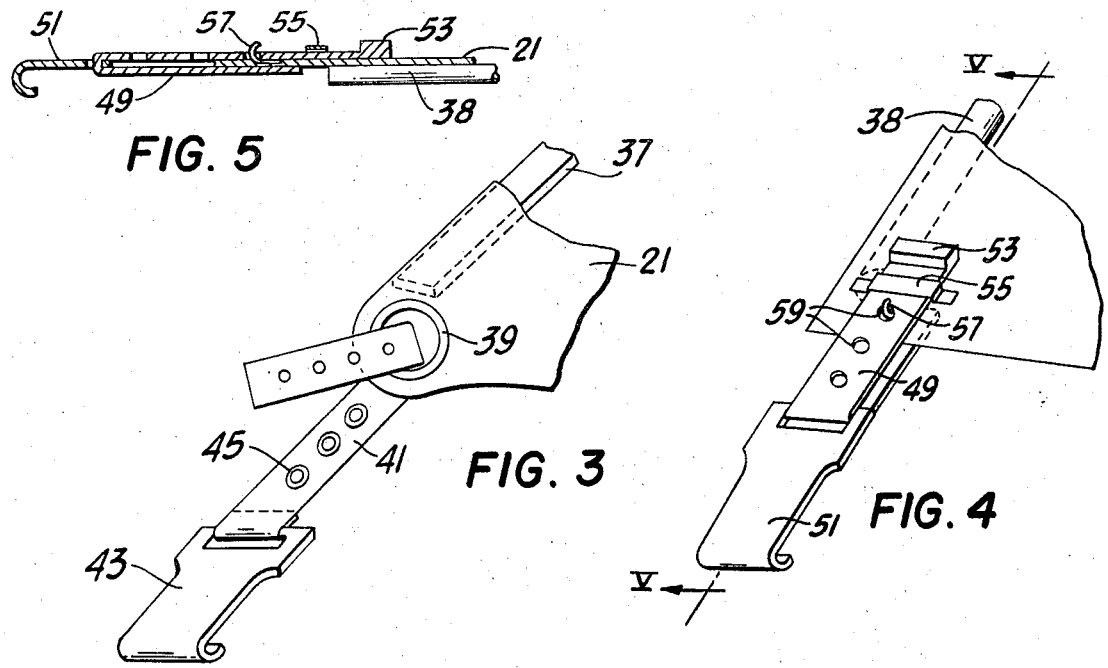
FIG. 3 is a detail, at an enlarged scale, of a portion of the structure shown in FIG. 2.
FIG. 4 is a schematic perspective view of a modification of the structure of FIG. 1.
FIG. 5 is a view along line V—V of FIG. 4.

FIGS. 4 and 5 illustrate a modification of the feature of my invention shown in FIG. 3, wherein an elasticized strap 49 is secured at one end to the membrane 21 with the strap 49 carrying a hook-type fastener 51 that is similar to the hook-type connector 43. The other end 53 of the strap 49 passes through the fastener 51 and under a band 55 secured to the membrane 21 about where shown, and the end 53 is enlarged as shown to prevent such end 53 from sliding through the band 55 when the visor 17 is not being used.

The membrane 21, at a location adjacent the band 55, carries a hook 57 that cooperates with conventional grommets 59 set into the strap 49. Thus, when the visor is positioned on an automobile, the connectors 43 or fasteners 51 engage the rain guard 47 of the automobile and then the straps 41 or 49 are caused to pull the membrane taut and the straps are secured to keep the membrane in such condition.

It is recognized that there are two general type sizes of automobiles; one being a standard sedan type automobile and the other being a small, compact type automobile. Therefore, in accordance with my invention, I provide two standard sizes of visors 17. However, it should be understood that they differ only in size and not in constructional features. The foregoing description is applicable equally to both types of visors.

Those skilled in the art will recognize that the windshield visor or shelter of my invention has many significant features and advantages among which the most significant are:

That my visor is simple to install and that it is equally simple to remove from an automobile;

That my visor is effective in preventing natural precipitation, such as rain and snow, from striking the windshield of an automobile parked at an outdoor drive-in theater whereby patrons thereof sitting in the vehicle continue to have a clear view of the theater screen and they do not have to operate windshield wipers to clear precipitation from the windshield;

That my invention is easily carried in one's automobile where it is readily available, or it may be easily and conveniently stowed at the drive-in theater for rental disbursement by the theater management; and That the starting and continual operation of windshield wipers as is customary in inclement weather at present is entirely eliminated by the use of my visor, wherefore, pollution of the atmosphere by the automobile exhaust is eliminated.

Although the invention has been described herein with a certain degree of particularity, it is understood that the disclosure is made only as an example and the scope of my invention is defined by what is hereinafter claimed.

What is claimed is:

1. A visor for preventing rain and snow and the like natural precipitation from striking a wind shield of an automobile comprising:
   a. a frame including at least one member that is engageable with said automobile and that is positionable above and in front of said windshield;
   b. a membrane covering said frame;
   c. means supporting said frame and membrane from the front portion of said automobile;
   d. means rigidifying the outer longitudinal edges of said membrane;
   e. means rigidifying the center portion of said membrane;
   f. at least one strap secured at one end to said membrane and carrying fastener means for engaging said automobile and with the other end slidably secured to said membrane; and
   g. hook means carried by said membrane for engagement with said strap to hold and secure said visor in position on said automobile.

2. The invention of claim 1 wherein:
   a. said visor is vaulted in the center; and
   b. said visor is collapsible.

3. A visor for preventing rain and snow and the like natural precipitation from striking the windshield of an automobile comprising:
   a. a frame having a support that is engageable with said automobile and that is positionable above and in front of said windshield;
   b. a membrane covering said frame;
   c. means supporting said frame from the front portion of said automobile and adjustable means connected to said membrane for releasably securing said membrane to said automobile,
   d. said adjustable means including at least one strap secured to said membrane and carrying a fastener for engaging said automobile at one end and with the other end slidably secured to said membrane;
   e. hook means on the membrane for engaging said strap and securing said visor in position; and
   f. means removably securing said frame and membrane to said automobile.

* * * * *